United States Patent [19]

Kano et al.

[11] Patent Number: 4,664,440
[45] Date of Patent: May 12, 1987

[54] ROOF DOOR STRUCTURE FOR VEHICLES

[75] Inventors: Noboru Kano; Akinori Saito, both of Toyota, Japan

[73] Assignees: Toyota Jidosha Kabushiki Kaisha; Aisin Seiki Kabushiki Kaisha, both of Japan

[21] Appl. No.: 770,975

[22] Filed: Aug. 30, 1985

[30] Foreign Application Priority Data

Aug. 31, 1984 [JP] Japan ............................ 59-131236[U]
Aug. 31, 1984 [JP] Japan ............................ 59-131237[U]

[51] Int. Cl.⁴ .......................... B60R 13/02; B60J 7/16; B60J 7/19
[52] U.S. Cl. ................................. 296/214; 296/216; 296/224; 292/170; 292/DIG. 5
[58] Field of Search .............. 296/216, 222, 218, 224, 296/214; 292/170, 150, DIG. 5

[56] References Cited

U.S. PATENT DOCUMENTS

| | | | |
|---|---|---|---|
| 655,543 | 8/1900 | Bohlen | 292/170 |
| 3,385,622 | 5/1968 | Winger | 292/170 |
| 3,751,087 | 8/1973 | Hawkins | 292/170 |
| 4,005,901 | 2/1977 | Lutke et al. | 296/224 |
| 4,422,687 | 12/1983 | Kaltz et al. | 296/221 |
| 4,422,689 | 12/1983 | Yamamoto et al. | 296/224 |

FOREIGN PATENT DOCUMENTS 107051 8/1981 Japan.

Primary Examiner—Robert B. Reeves
Assistant Examiner—Dennis H. Pedder
Attorney, Agent, or Firm—Finnegan, Henderson, Farabow, Garrett & Dunner

[57] ABSTRACT

A vehicle roof structure including a stationary roof panel having an opening and a movable roof panel having a contour conforming to the opening. A handle is attached to the movable roof panel for manually positioning the movable roof panel. A support structure is connected to the stationary roof panel along the opening for releasably receiving a sliding bar extending from the handle. The support structure includes a plate secured to the stationary roof panel and a wall portion connected to the plate and defining a locking hole formed within the wall portion to receive the sliding bar. The handle includes an unlocking member for disengaging the sliding bar when positioned within the locking hole. In addition, the sliding bar contains a cam surface having a projection for contacting the unlocking member. Further, as least one inner panel is slidably positioned along the opening of the vehicle roof structure and supported by the wall portion.

11 Claims, 10 Drawing Figures

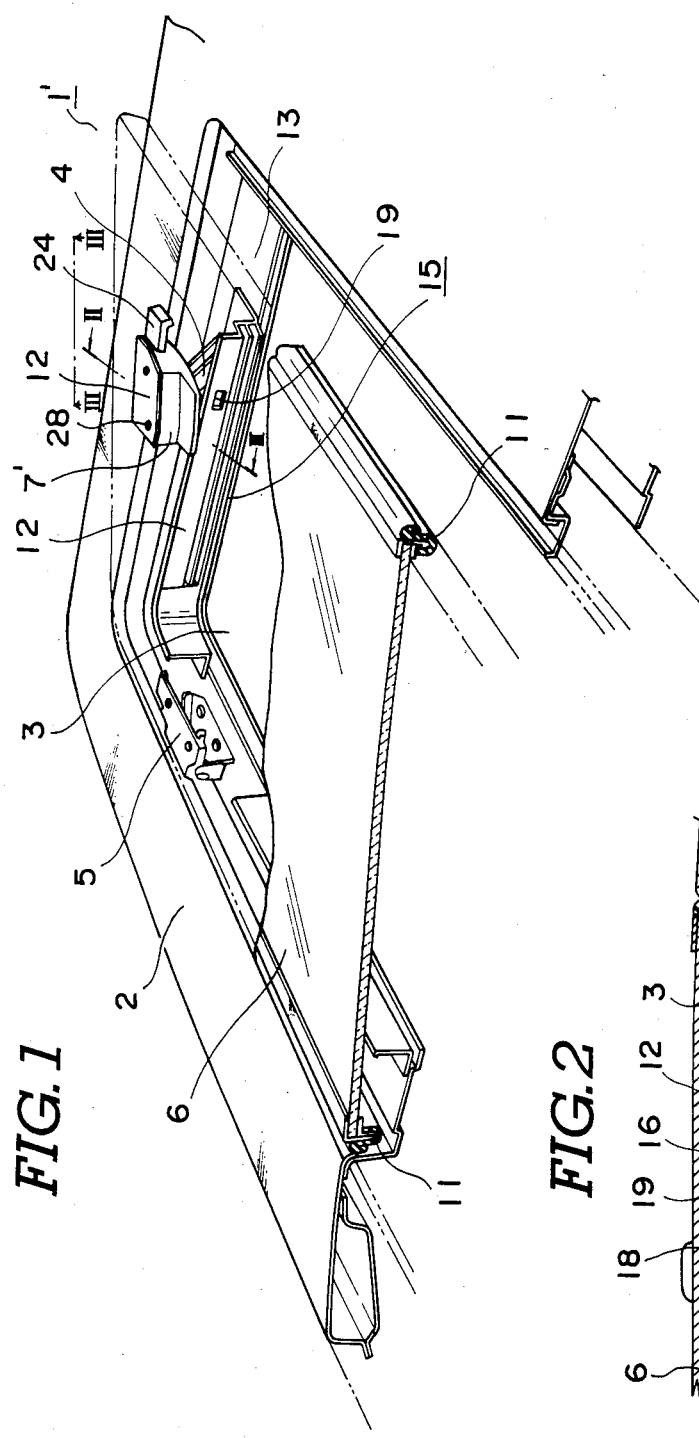
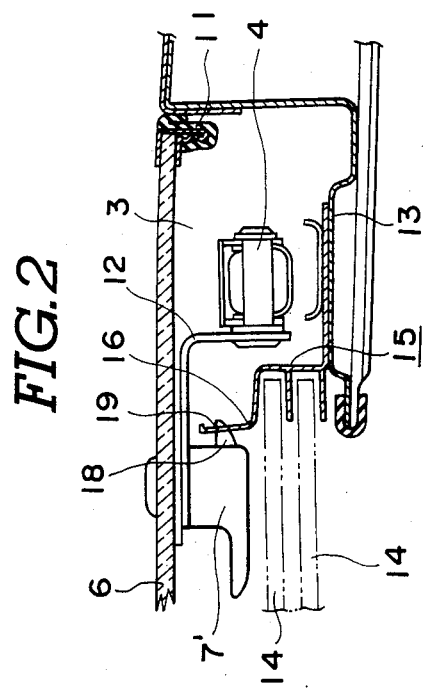

ROOF DOOR STRUCTURE FOR VEHICLES

FIELD OF THE INVENTION

This inventions relates to the technical field of a roof door structure provided in a roof panel of a vehicle.

DESCRIPTION OF THE PRIOR ART

A roof door for vehicles is generally provided in an opening made in a roof panel, and it is known as a structure giving the passengers in the vehicle a sense of relief and ventilating the interior of the vehicle excellently. There are various types of roof doors in which the roof door panels covering the openings in the roof panels move in different manners. A tilt-up type roof door is known, which is adapted to be lifted at a rear end of its roof door panel and thereby ventilate the interior of the vehicle, and which uses a roof door panel of glass so as to provide a sense of freedom.

As generally known, there is a conventional mode of tilt-up type roof door 1 illustrated in FIGS. 8, 9 and 10. This roof door 1 has a glass roof door panel 6 set pivotably in an opening 3, which is formed in a roof panel 2 of a vehicle, via a pantograph type bracket 4 and a hinge 5. This roof door panel 6 can be opened and closed as necessary from the inside of the vehicle by a handle 7 provided on the lower surface, which faces the interior of the vehicle, of the roof door panel 6.

In the above-described roof door 1 made on the basis of the conventional techniques, a spring 9 is provided as shown in detail in FIG. 10 on one link 10 in the pantograph type bracket 4, and the other link 10, the front end of which is supported pivotably via a pin on the mentioned link 8, is snap-locked when the roof door panel 6 is closed. However, when the vehicle runs on, for example, a bumpy rod, the head of a passenger would contact the handle 7 to cause the roof door panel 6 to be opened.

A roof door developed with a view to eliminating these inconveniences has been proposed, in which a locking member provided on a roof door panel is engaged with a locking portion provided in a roof panel, to lock the roof door as disclosed in Japanese Utility Model Laid-open No. 107051/1981. However, the construction of this roof door is very complicated.

Since the construction of this roof door is complicated, the number of parts increases, so that the manufacturing cost becomes high.

SUMMARY OF THE INVENTION

An object of the device in the present application is to provide roof door structure for vehicles, which is capable of solving the technical problems in a roof door structure for vehicles which is made on the basis of the conventional techniques; and which has a very simple construction, an excellently controllable operation, a very reliable locking means and a great advantage which contributes much to the field, in which vehicle bodies are utilized, of the vehicle-manufacturing industries.

BRIEF DESCRIPTION OF THE DRAWINGS

FIG. 1 is a general perspective view of the present invention;

FIG. 2 is a sectional view taken along the line II—II in FIG. 1;

DETAILED DESCRIPTION OF THE PREFERRED EMBODIMENT

Figure 8:
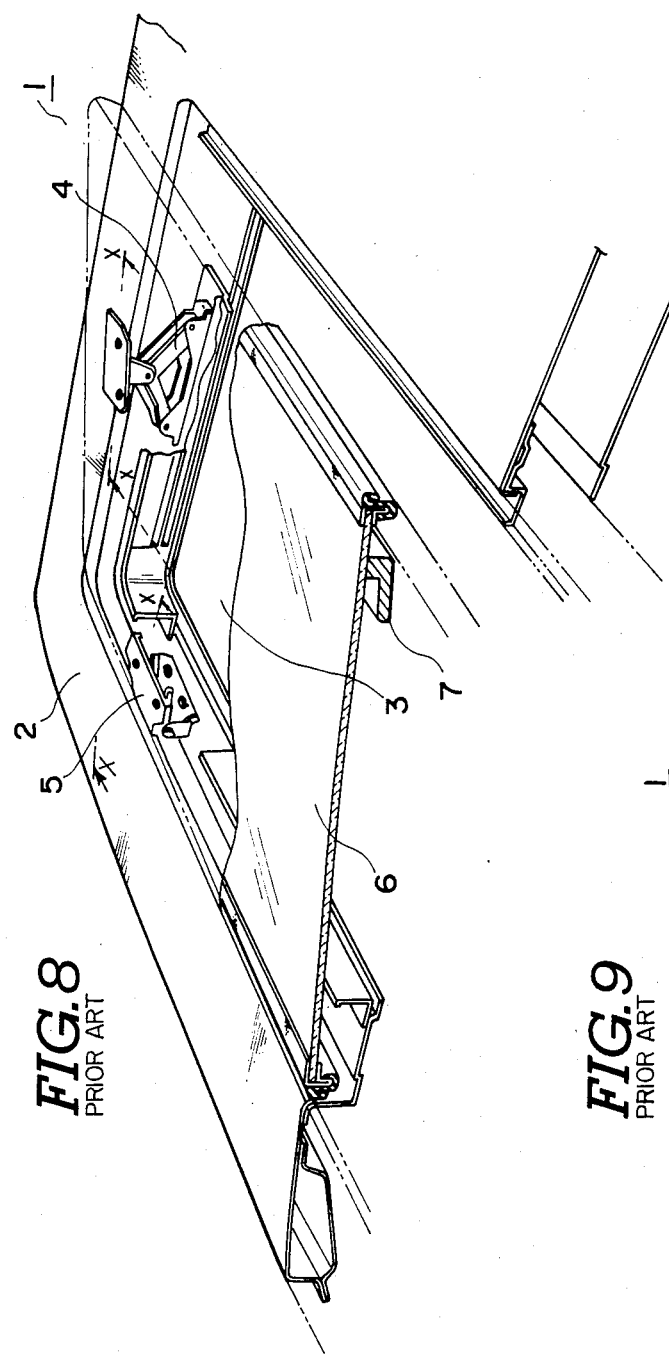
FIG. 8 is a general perspective view of a conventional device.
Figure 9:
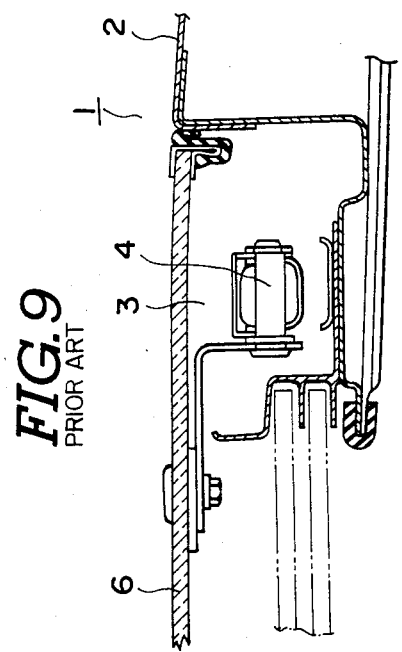
FIG. 9 is a front elevation of a pantograph type bracket used in connection with a conventional movable roof panel for a vehicle.

An embodiment of this device will now be described on the basis of FIGS. 1-2 with the assistance of FIGS. 8-10.

This embodiment will be described by using the same reference numerals for the parts thereof which are identical with or equivalent to the parts of the prior art device of this kind.

The device shown in FIGS. 1 and 2 is a tilt-up type roof door 1', which constitutes the gist of this device, which includes pantograph type brackets 4 provided at both sides of an opening 3 of a roof panel 2, a hinge 5 provided at the front side of the opening 3, and a glass roof door panel 6 provided pivotably via the brackets 4 and hinge 5. Seal members 11 are provided at the outer edges of the roof door panel 6.

A handle 7' for opening and closing the roof door panel 6 is provided on the lower surface of a plate 12, which is used to mount a bracket 4 to the roof door panel 6, as shown in FIG. 2. The handle 7' is thus fixed unitarily to the roof door panel 6 with the mounting plate 12.

As shown in FIG. 2, a cross-sectionally E-shaped wall portion or rail 15, along which the sunshades 14 made of a resin slide, is provided at an inner end of a plate 13, which is disposed below the bracket 4 attached to the plate 12. The sunshades 14 provided on the rail 15 are slid in the direction which is at right angles to the surface of the drawing, i.e., along the longitudinal axis of the vehicle, so that the sunlight entering the interior of the vehicle through the roof door panel 6 can be shut off as necessary.

A shielding wall 16 is formed as a vertical wall at an upper portion of the rail 15 so as to keep the bracket unseen from the interior of the vehicle.

Figure 3:
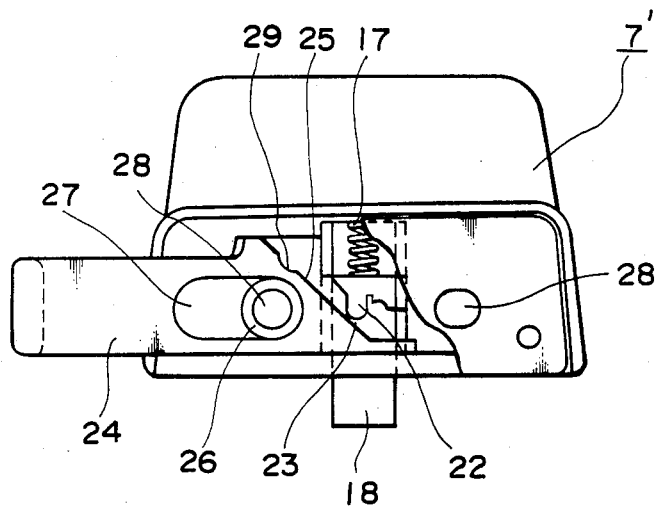
FIG. 3 is a cutaway plan view looking downward along line III—III in FIG. 1.
Figure 4:
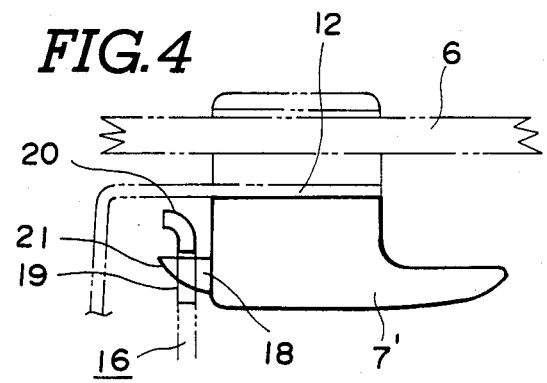
FIG. 4 is a front elevation view of a handle.
Figure 5:
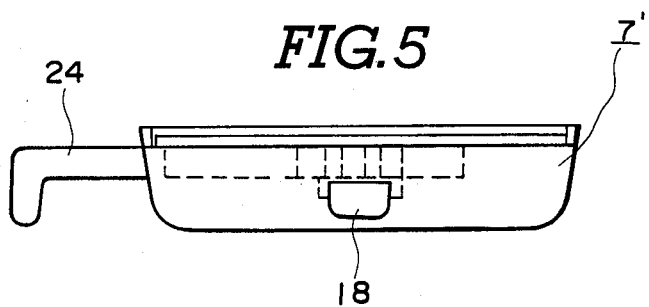
FIG. 5 is a side elevation view of the handle of the present invention.

As shown in FIGS. 3, 4, 5, 6, and 7, the handle 7' is formed substantially in the shape of the letter "L" in its front elevation, and attached to the lower surface of the plate 12 on which the bracket 4 is mounted. The handle 7' is provided therein with a locking bar 18, which serves as a locking member urged toward the shielding wall 16 via a coiled spring 17, which is provided on the inside wall of handle 17 as shown in FIG. 3. As such the locking bar 18 can project from the handle 7' and engage a locking hole 19 formed as a locking portion in the shielding wall 16.

The locking bar 18 is provided at its free end portion with a curved profiled surface 21 with respect to a curved portion 20 at the free end section of the shielding wall 16. Accordingly, when the handle 7' is lowered, the locking bar 18 is moved back smoothly to engage with the locking hole 19. The locking bar 18 is provided on its upper surface with a cam surface 23 having a projection 22.

A sliding unlocking bar 24 is provided so as to extend from the rear side of the vehicle in the direction which is at right angles to the locking bar 18, and a guide surface 25, which contacts the cam surface 23 of the locking bar 18, is formed at a front end portion of the unlocking bar 24. The unlocking bar 24 is slid within a distance corresponding to the length of an elongated hole 27 fitted around a boss 26 formed on the upper surface of the handle 7', so as to move the locking bar 18 back against the spring 17.

Holes 28 for setting the roof door panel 6 are provided in the boss 26 and in the portion of the handle which is on the opposite side of the boss 26 with respect to the locking bar 18.

A locking recess 29, which the projection 22 on the cam surface 23 formed on the locking bar 18 engages, is provided in the portion of the guide surface 25 which prevents the locking bar 18 from engaging the locking hole 19.

The locking recess 29 engages the projection 22 on the cam surface formed on the locking bar 18, and it is not disengaged therefrom by the resilient force of the coiled spring 17.

The depth of the locking recess 29 is such that it disengages from the projection 22 when the unlocking bar 24 is pulled.

Figure 10:
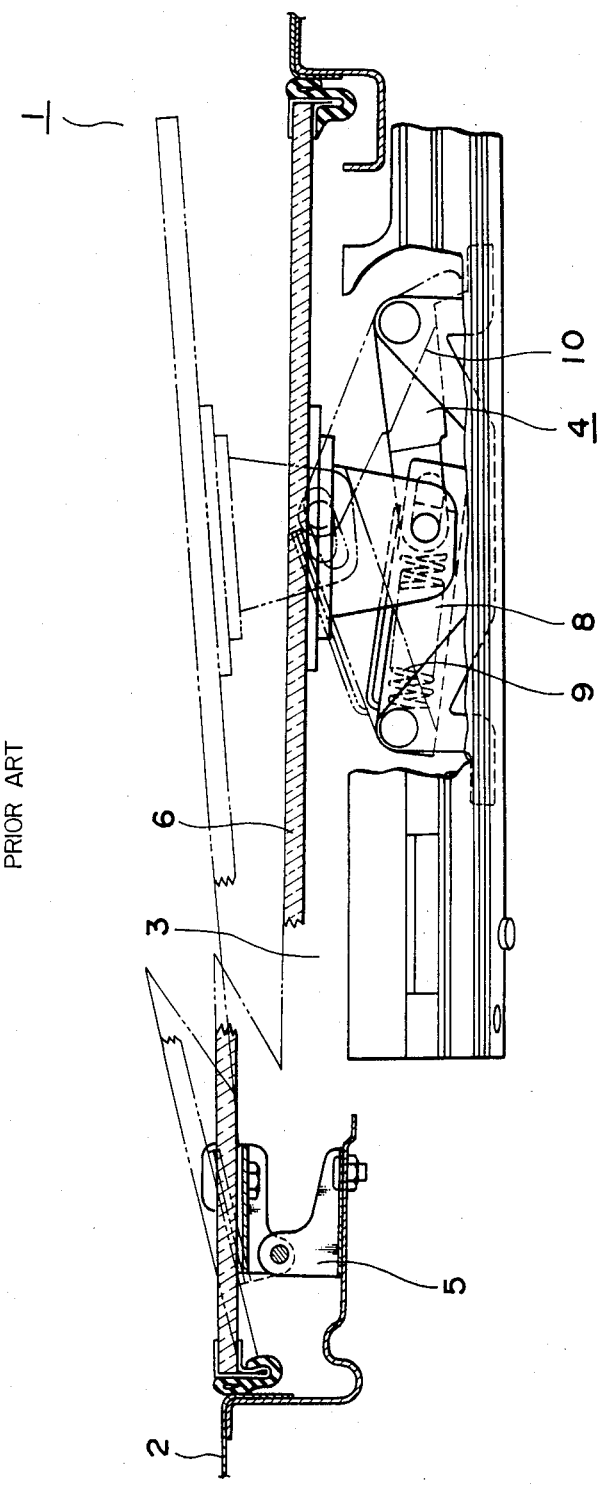
FIG. 10 is an enlarged sectional view of the conventional device of FIG. 8 taken along lines X—X.

In order to close the roof door panel 6, which is in an opened state as shown in FIG. 1, in the above-described arrangement, the handle 7' is lowered as it is gripped, so that the roof door panel 6 is turned about the hinge 5 to lower against the spring 9 in the bracket 4 shown in FIG. 10.

Consequently, the profiled surface 21 of the locking bar 18 in the handle 7' is pressed by the curved portion 20 of the shielding wall 16 and moved back against the coiled spring 17. When the locking bar 18 then engages the locking hole 19, the roof door panel 6 is locked as shown in FIG. 2.

Accordingly, when the roof door panel 6 is closed, the locking bar 18 is in engagement with the locking hole 19. Therefore, even when the head of a passenger contacts the roof door panel 6, it is not opened. The roof door panel 6 is not shaken while the vehicle runs, nor is it forced open from the outside.

The shielding wall 16 has a curved portion 20 at its free end section, and, moreover, it extends upward. Hence, it can receive the locking bar 18 smoothly by its own resilient force. Since this device can utilize the conventional parts as they are, the number of parts and part-combining steps do not increase.

In order to open the roof door panel 6, the handle 7' is gripped, and the unlocking bar 24 is pressed. As a result, the guide surface 25 formed at the free end of the slided unlocking bar 24 presses the cam surface 23 of the locking bar 18 to move the bar 18 back against the coiled spring 17. Consequently, the locking bar 18 is released from the locking hole 19 in the shielding wall, and the handle 17' is then raised, so that the roof door panel 6 is opened.

Thus, the roof door panel 6 can be opened and closed by a single action. Accordingly, even when the driver opens or closes the roof door panel 6, this action does not interfere with his driving.

When it is necessary that the roof door panel 6 be opened and closed frequently, for example, while the vehicle is driven over a long distance, it may be troublesome to operate the unlocking bar 24 for opening the roof door panel 6.

Figure 6:
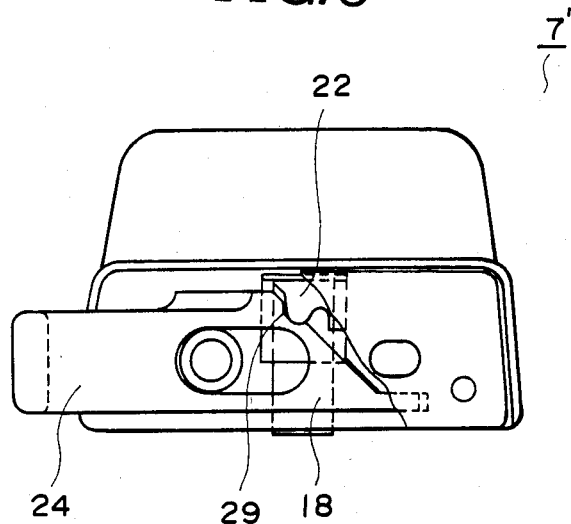
FIG. 6 is a top plan view of the handle of the present invention illustrating the cooperation between the locking bar and the unlocking bar.
Figure 7:
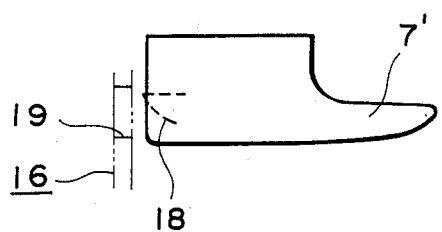
FIG. 7 is a front elevation view of a handle disengaged from the locking hole.

In such a case, the unlocking bar 24 is pressed to engage the locking recess 29 in the guide surface 25 thereof with the projection 22 on the cam surface of the locking bar 18, so that the locking bar 18 is fixed in the position. Therefore, the locking bar 18 does not engage the locking hole 19 in the shielding wall 16 as shown in FIGS. 6 and 7.

Accordingly, a person in the vehicle can open and close the roof door panel 6 by merely moving the handle 7' up and down.

When the vehicle is stopped with the persons therein then leaving the same, the roof door panel 6 is closed, and the unlocking bar 24 is pulled. As a result, the locking bar 18 disengaged from the locking recess 29 projects from the handle 7' due to the resilient force of the spring 17, and the roof door panel 6 is locked.

When the roof door panel 6 is closed as the unlocking bar 24 is operated, the locking bar 18 is moved back due to the curved portion 20 of the shielding wall 16. However, since the locking recess 29 is formed on the opposite side of the locking bar 18 and in the position which is behind the dead point in the path in which the locking bar 18 is moved back, the unlocking bar 24 and locking bar 18 do not engage each other at the locking recess 29 and projection 22 during normal use of this roof door structure.

Since the roof door panel 6 can thus be closed in a locked state or non-locked state, the value of use of this device is very high, and a comfortable drive can be taken.

And while the roof door panel 6 is opened the sunshades 14, 14 may be opened or closed as necessary to regulate the quantity of light entering the interior of the vehicle.

The mode of embodiment of this device is not, of course, limited to that of the above-described embodiment. For example, the roof door panel is not limited to a tilt-up type roof door panel; it may be of a sliding type, and the projection and the locking recess may be provided on the unlocking bar and in the locking bar, respectively. Various other modes of roof door panel can be employed.

According to this device, the roof door can be opened and closed by a single unlocking action and a single locking action. This device enables the functions of the roof door of giving the passengers a sense of freedom and ventilating the interior of the vehicle excellently to be further improved, and comfortable driving to be done reliably.

The locking member in the roof door-opening-and-closing handle provided on the roof door panel is made engageable with the locking portion of the vertical wall provided on the roof panel, so that the roof door panel can be locked reliably. Accordingly, the roof door panel is not shaken while the vehicle runs, and, even when the head of a passenger contacts the roof door panel, it is not opened. Also, the roof door panel cannot be forced open from the outside.

The handle provided with a locking member further has therein an unlocking member for disengaging the locking member from a locking portion, and a resilient member for urging the locking member toward the locking portion. Accordingly, the engaging of the locking member with the locking portion can be done more reliably, and the unlocking of the locking member can also be done simply.

The locking member and unlocking member are provided with a cam surface and a guide surface, respectively, which engage each other, and a locking recess, which is adapted to fix the locking member in an unlocked position, is provided in either the cam surface or the guide surface. Therefore, for example, when the operations for locking and unlocking the roof door panel by using the unlocking member is troublesome, the locking member can be so as not to engage the locking portion. Hence, the roof door panel can be set in a constantly unlocked state as necessary, and the degree of freedom of selecting the mode of use of the roof door structure increases.

Since the locking member is provided in the handle, fewer parts are required, and the construction of the roof door structure can be simplified. This enables the manufacturing cost to be reduced.

What is claimed is:

1. A vehicle roof structure comprising:
   a stationary roof panel having an opening;
   a movable roof panel having a contour conforming to said opening;
   handle means attached to said movable roof panel for maunually positioning said movable roof panel, said handle means having a sliding bar extending therefrom;
   support means connected to said stationary roof panel along said opening for releasably receiving said sliding bar, said support means including a plate secured to said stationary roof panel, said support means also including a wall portion connected to said plate, said support means defining a locking hole formed within said wall portion to receive said sliding bar;
   at least one inner panel slidably positioned along said opening; and
   sliding means provided in said wall portion for slidably supporting said at least one inner panel.

2. The vehicle roof structure defined in claim 1, wherein said sliding means includes rails extending along said wall portion for slidably receiving said at least one inner panel.

3. The vehicle roof structure defined in claim 1, wherein said movable roof panel is glass.

4. The vehicle roof structure defined in claim 1, wherein said at least one inner panel is a sunshade.

5. The vehicle roof structure defined in claim 1, also including pivotal means connected between said plate and said movable roof panel for pivotally positioning said movable roof panel.

6. The vehicle roof structure defined in claim 1, wherein said handle means includes unlocking means for disengaging said sliding bar when positioned within said locking hole.

7. The vehicle roof structure defined in claim 5, wherein said pivotal means includes at least one pantograph-type bracket.

8. The vehicle roof structure defined in claim 6, wherein said handle means includes spring means connected to said sliding bar for biasing said sliding bar to project from said handle means, and wherein said sliding bar includes a cm surface having a projection for contacting said unlocking means.

9. The vehicle roof structure defined in claim 8, wherein said unlocking means includes an unlocking bar and means for slidably mounting said unlocking bar on said handle means.

10. The vehicle roof structure defined in claim 8, wherein said unlocking means includes a guide surface for engaging said cam surface and forcing said sliding bar out of said locking hole.

11. The vehicle roof structure defined in claim 8, wherein said unlocking means includes a recess for engaging said projection to prevent said sliding bar from slidably engaging said locking hole.

* * * * *